United States Patent [19]
Tucker

[11] Patent Number: 5,671,933
[45] Date of Patent: Sep. 30, 1997

[54] UTILITY CART

[76] Inventor: Ray D. Tucker, 1719 Searcy, San Antonio, Tex. 78232

[21] Appl. No.: 527,941

[22] Filed: Sep. 14, 1995

[51] Int. Cl.⁶ ............................................... B62B 1/00
[52] U.S. Cl. ........................ 280/47.19; 280/47.26; 280/47.24
[58] Field of Search ................... 280/47.131, 47.17, 280/47.19, 47.23, 47.24, 47.26, 47.27, 47.28, 47.35; D3/313; D32/37

[56] References Cited

U.S. PATENT DOCUMENTS

| | | | |
|---|---|---|---|
| D. 154,640 | 7/1949 | Sasser | 280/47.19 |
| D. 342,365 | 12/1993 | Conaway et al. | |
| D. 344,823 | 3/1994 | Wilgus et al. | |
| 2,950,925 | 8/1960 | Larson | 280/47.19 |
| 4,066,156 | 1/1978 | Basile | 280/47.26 |
| 4,452,468 | 6/1984 | Eads et al. | 280/47.19 |
| 4,632,412 | 12/1986 | Nasgowitz | 280/47.26 |
| 4,749,101 | 6/1988 | Durkan, Jr. | 280/47.17 |
| 4,779,794 | 10/1988 | Moore | |
| 4,781,300 | 11/1988 | Long | |
| 4,981,232 | 1/1991 | Wynn | |
| 5,213,351 | 5/1993 | Chen | 280/47.19 |
| 5,261,562 | 11/1993 | Prout et al. | |
| 5,279,443 | 1/1994 | Koda et al. | |
| 5,318,315 | 6/1994 | White et al. | |
| 5,356,027 | 10/1994 | Craft et al. | |
| 5,511,807 | 4/1996 | Snyder | 280/47.26 |

FOREIGN PATENT DOCUMENTS

| | | | |
|---|---|---|---|
| 965814 | 4/1975 | Canada | 280/47.35 |
| 28529 | 12/1956 | Finland | |
| 3627790 | 2/1988 | Germany | 280/47.35 |
| 286530 | 3/1928 | United Kingdom | |
| 2177354 | 1/1987 | United Kingdom | 280/47.35 |
| 85/03045 | 7/1985 | WIPO | 280/47.17 |
| 93/22176 | 11/1993 | WIPO | 280/47.24 |

Primary Examiner—Brian L. Johnson
Assistant Examiner—Min Yu
Attorney, Agent, or Firm—Richard C. Litman

[57] ABSTRACT

A utility cart includes an open upper bin or container, with an open lower storage shelf disposed immediately below the upper bin. The lower shelf floor also serves as a support for the cart when it is placed in a generally vertical rest position. Wheels are provided at the rearward portion of the cart, allowing the cart to be moved on the wheels with essentially the entire weight of the cart being supported by the wheels while in transport, thus precluding any substantial requirement for the user to lift any significant portion of the weight of the cart and/or its contents. The cart may be molded or cast of plastic material as a single, unitary component with the exception of the wheels. The cart is particularly adapted for laundry use, with the upper basket being used to contain clothing and the lower storage shelf being used to contain laundry supplies. However, the cart is also readily adaptable for use in performing other chores and tasks as well.

18 Claims, 3 Drawing Sheets

UTILITY CART

FIELD OF THE INVENTION

The present invention relates generally to wheeled carts, such as hand trucks and the like, and more specifically to a utility cart which includes an upper level basket and a lower level shelf. The bottom of the cart also serves as a support for the forward portion of the cart when the cart is not in motion, with the wheels assisting in the support of the rearward portion of the cart at rest, and supporting the entire cart when the cart is tilted rearwardly from the vertical. The cart is particularly adapted for use in the storage and transport of laundry and laundry supplies, but may be used for a number of other tasks as well.

BACKGROUND OF THE INVENTION

Various household chores, such as the periodic need to take care of the laundry, as well as other tasks, are a necessary part of virtually everyone's life. While various machines have been developed over the years to make this chore somewhat easier (e. g., automatic washers and dryers), little has been done to ease the transport of laundry and laundry supplies to and from the washing and drying equipment. Conventional baskets have likely been used since antiquity for the carriage of laundry and clothing, and are still used in various forms today. Such baskets have numerous disadvantages, such as the need to lift and carry them, their relative size and bulk which obstructs the view of the path of the carrier immediately in front, and the lack of any provision for carrying additional supplies.

Accordingly, a need will be seen for a wheeled utility cart which is adapted for use in the home laundry environment. The cart should include wheels and a handle, thus enabling a user to use the cart somewhat in the manner of a hand truck, with the wheels supporting the weight of the cart and contents while the cart is tilted rearwardly with the center of mass over the wheels. Yet, the cart should be capable of being supported by the rearwardly disposed wheels and forwardly disposed support portion to remain upright when at rest. The cart should include both an upper open storage area and a lower storage shelf which also serves as the support for the forward portion of the cart when at rest. While the present cart is particularly adapted for use in laundry work, it is readily adaptable to numerous other chores as well.

DESCRIPTION OF THE PRIOR ART

U.S. Pat. No. 4,779,794 issued to Gail S. Moore on Oct. 25, 1988 describes a Spherical Laundry Basket including a flat bottom pad or rest. No wheels are disclosed; rather, the basket is pulled by means of a strap attached to one side thereof. The basket generally comprises two halves which are closable to enclose completely any articles therein, whereas both the upper and the lower areas of the present cart are open. A supplementary compartment is included in the main compartment, rather than being a separate open area, as in the present cart.

U.S. Pat. No. 4,781,300 issued to Florence M. Long on Nov. 1, 1988 describes a Folding Basket For Laundry And Other Uses. The device comprises four separable side panels which are removably attached to a floor panel by hinge pins. The article forms a conventional basket, rather than a wheeled cart.

U.S. Pat. No. 4,981,232 issued to Paul M. Wynn on Jan. 1, 1991 describes a Laundry Basket of generally conventional configuration, but including a laterally separated secondary compartment for laundry equipment. No wheels or generally vertical configuration is disclosed.

U.S. Pat. No. 5,261,562 issued to J. Timothy Prout et al. on Nov. 16, 1993 describes a Blow-Molded Container With Blow-Molded Handle. The container formed is a wheeled trash receptacle, with the bottoms of the wheels extending below the floor of the receptacle when the device is at rest. The floor includes at least one bumper extending therebelow, serving to support the front portion of the container when it is at rest. The present invention provides a much neater means of accomplishing the above, providing a wheel diameter and axle location which positions the bottoms of the wheels coplanar with the bottom of the forward portion of the cart. Thus, no additional bumpers or the like are required with the present invention, yet by tilting the present cart rearwardly, it may be used in the manner of a hand truck or the like, with the entire weight of the cart and contents being supported by the wheels. The present cart also includes ventilation in the open upper container portion to allow air circulation, which feature would be undesirable in a trash container due to the possible emanation of odors and/or entrance of vermin into the container. The present container has no lid, which would be cumbersome and limit air circulation, whereas a lid required in a trash container such as the Prout et al. device. Most importantly, the present invention generally comprises two vertically separated and open containers, which feature is not disclosed by Prout et al.

U.S. Pat. No. 5,279,443 issued to Walter P. Koda et al. on Jan. 18, 1994 describes a Laundry Basket And Handle Therefor, with the handle comprising a two part snap together configuration which is secured about the thin molded sheet hand passage of the basket. No relationship is seen to the present invention, other than that the laundry basket may include conventional ventilation passages therethrough.

U.S. Pat. No. 5,318,315 issued to Adam N. White et al. on Jun. 7, 1994 describes a Portable Wheeled Cart For Work In Yard And Garden, with the cart having relatively large front wheels and a single lateral bar rearwardly disposed for resting support of the rear of the cart. Accordingly, when the cart is to be moved, it must be tilted forwardly to raise the rear support bar. Such inclination would spill any articles from the front of a cart having a substantially open front, as in the present cart, and the need to lift the rear of the cart requires a user to support at least some of the weight of the cart, rather than needing merely to tilt the cart rearward to balance the entire weight of the cart essentially over the wheels, as in the present utility cart. White et al. do not disclose a separate storage area below the main bin of the cart, as provided by the present invention.

U.S. Pat. No. 5,356,027 issued to Charles W. Craft et al. on Oct. 18, 1994 describes a Pivoting Lid Attachment For Refuse Container. The container configuration is very close to that described in the Prout et al. patent discussed further above, with essentially the same limitations and distinctions relative to the present utility cart. The Craft et al. patent is primarily directed to a lid attachment, which feature would not be suitable for use with the present cart.

U.S. Pat. No. D-342,365 issued to Brian J. Conaway et al. on Dec. 14, 1993 describes a design for a Clothes Hamper of generally conventional configuration. No wheels, handle means, or double open bins or storage areas in a vertical array are disclosed, as provided by the present invention.

U.S. Pat. No. D-344,823 issued to Mitchell Wilgus et al. on Mar. 1, 1994 describes a design for a Laundry Hamper having a relatively low and wide configuration, along the lines of a conventional laundry basket. A lid is also included. However, as in the Conaway et al. hamper discussed immediately above, no wheels, handle means, or double open bins or storage areas in a vertical array are disclosed in the Wilgus et al. design.

British Patent Publication No. 286,530 to Richard J. Hewett and accepted on Mar. 8, 1928 describes an Apparatus For The Delivery And Receiving Of Packages And The Like, similar to a conventional mail chute in a mail box or the like. The device is permanently installed in a wall or partition, and serves to close the chute therebehind, unlike the open portable bins of the present cart.

Finally, Finnish Patent Publication No. 28,529 to Toivo Laaperi and published on Dec. 31, 1956 describes a laundry cabinet having a pair of laterally disposed enclosed bins. The lids apparently include some closure means. No wheels, handle, or vertically separated open bins or the like, are disclosed in the Finnish patent to Laaperi.

None of the above noted patents, taken either singly or in combination, are seen to disclose the specific arrangement of concepts disclosed by the present invention.

SUMMARY OF THE INVENTION

By the present invention, an improved utility cart disclosed.

Accordingly, one of the objects of the present invention is to provide an improved utility cart which is particularly adapted for laundry use, but which is also readily adaptable for use performing other tasks and chores.

Another of the objects of the present invention is to provide an improved utility cart which includes an upper open container and a lower storage area disposed generally vertically below the upper container.

Yet another of the objects of the present invention is to provide an improved utility cart which lower storage area floor also serves as a support for the cart when the cart is in a generally vertically disposed rest position.

Still another of the objects of the present invention is to provide an improved utility cart which includes a pair of rearwardly disposed wheels, which provide for essentially the entire support of the cart when the cart is tilted rearwardly to position the center of gravity essentially vertically over the wheels, thus precluding any requirement for lifting or supporting any portion of the cart during movement thereof and excessive strain on the back of a user of the cart.

A further object of the present invention is to provide an improved utility cart which upper bin or container includes an open top and ventilation passages disposed within at least two opposite panels, and which lower storage area includes only relatively low peripheral walls to provide ease of access to articles stored therein.

An additional object of the present invention is to provide an improved utility cart which includes support panel strengthening and stiffening means disposed between the upper and lower storage areas.

Another object of the present invention is to provide an improved utility cart which may be formed of polyethylene, polyurethane, or other plastics, as a single, unitary construction with the exception of the wheel means thereon.

A final object of the present invention is to provide an improved utility cart for the purposes described which is inexpensive, dependable and fully effective in accomplishing its intended purpose.

With these and other objects in view which will more readily appear as the nature of the invention is better understood, the invention consists in the novel combination and arrangement of parts hereinafter more fully described, illustrated and claimed with reference being made to the attached drawings.

BRIEF DESCRIPTION OF THE DRAWINGS

Similar reference characters denote corresponding features consistently throughout the several figures of the attached drawings.

DETAILED DESCRIPTION OF THE PREFERRED EMBODIMENT

Figure 1:
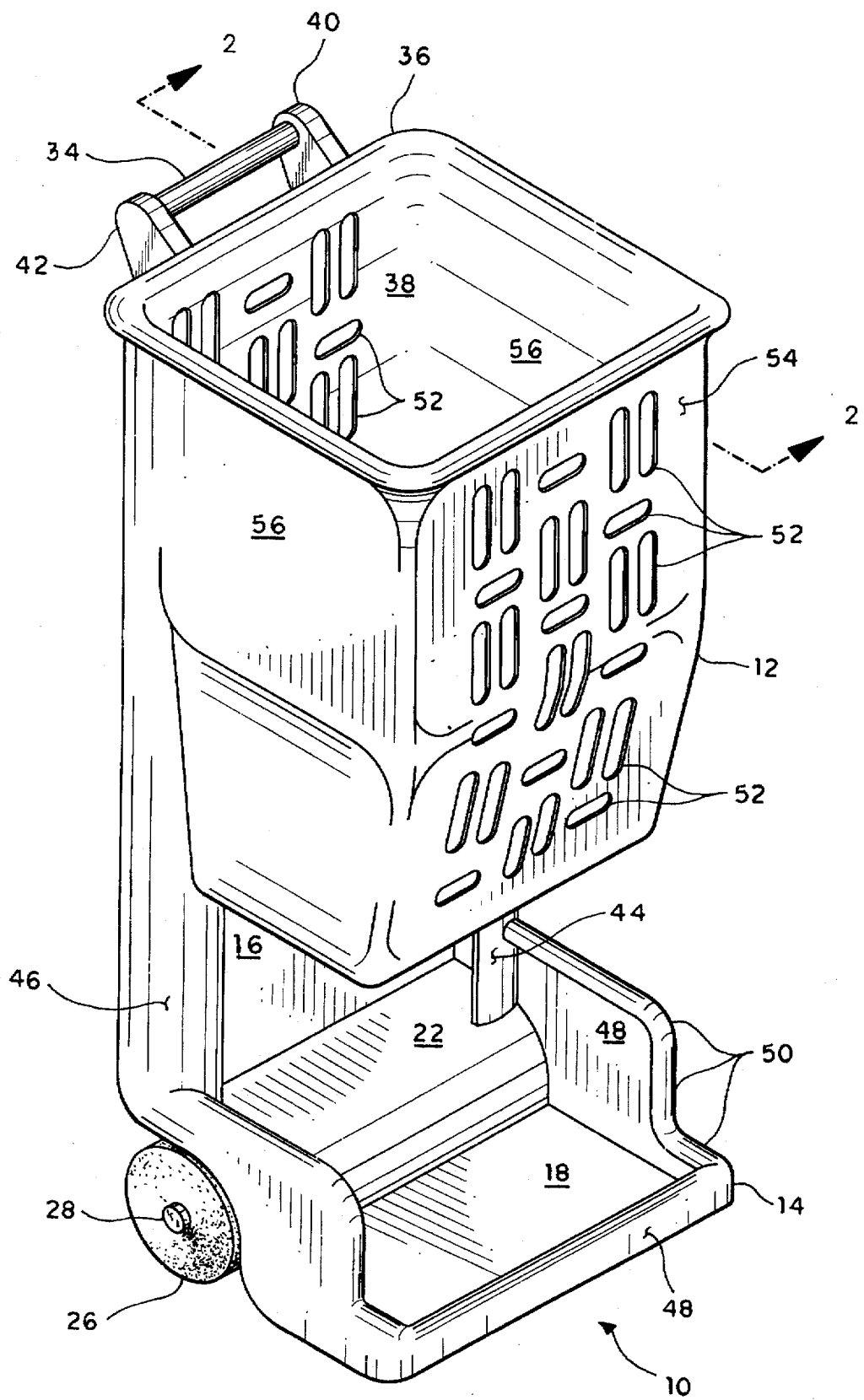
FIG. 1 is a front and right side perspective view of the present utility cart, showing its general configuration and features.

Referring now particularly to FIG. 1 of the drawings, the present invention will be seen to relate to a utility cart 10, generally comprising an open upper container or basket 12 and a lower shelf or storage area 14 disposed below the container 12. The container 12 and shelf 14 are connected by a single rear panel 16, with the rear panel 16 being substantially vertically disposed and the container 12 and shelf 14 forming a substantially vertical array when the cart 10 is positioned in a resting upright position. This relationship of the components and orientation of the cart 10 is apparent in the cross section elevation view of FIG. 2.

Figure 2:
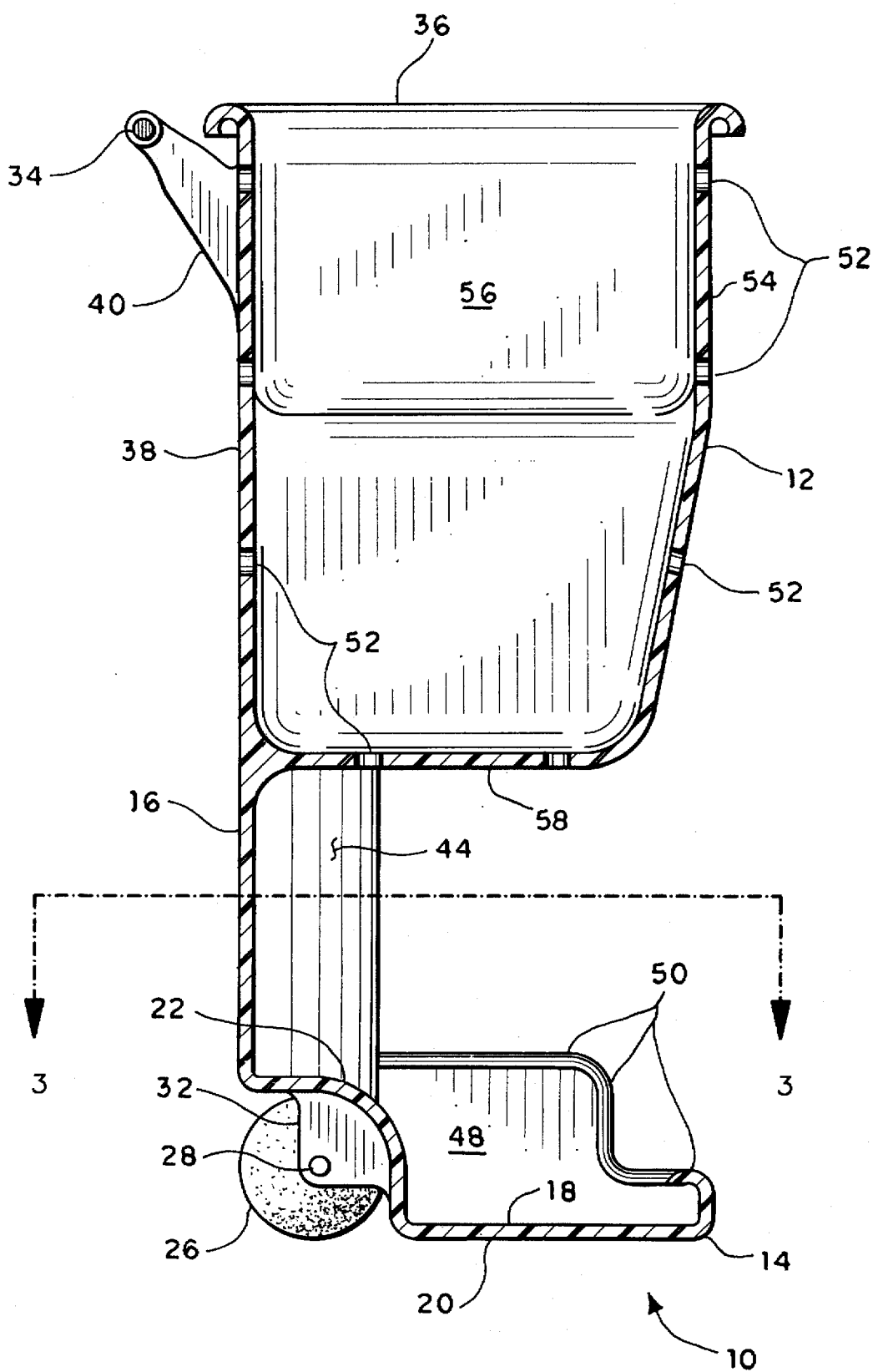
FIG. 2 is a right side elevation view in section along line 2—2 of FIG. 1, showing further details of the present cart.

FIG. 2 also discloses that the shelf 14 includes a floor portion 18, which floor 18 is a flat and level surface and is substantially horizontally disposed when the cart 10 is oriented in its substantially vertical rest position. The underside of the shelf floor 18 serves as a base support 20 for the cart 10 when it is in a substantially vertical position, with virtually the entire mass of the cart 10, and any articles which may be placed thereon, resting on the base support 20 when the cart 10 is positioned substantially vertically on a substantially flat and level underlying surface (e.g., floor, etc.).

Figure 3:
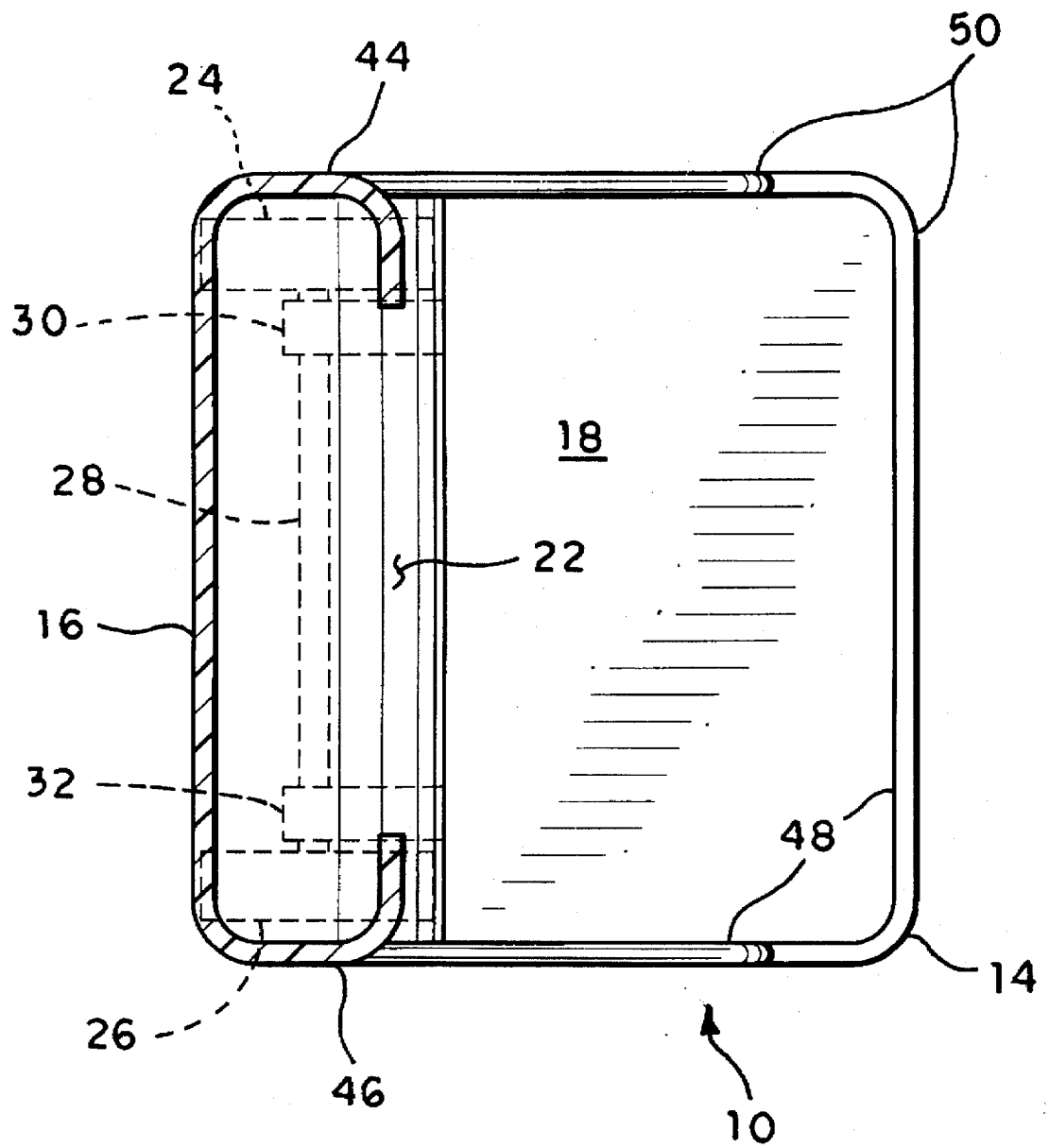
FIG. 3 is a top plan view in section along line 3—3 of FIG. 2, showing details of the rear panel structure.

The shelf floor 18 includes a raised rearward portion 22, which provides clearance for a pair of laterally spaced apart wheels 24 and 26 and their laterally disposed axle 28, indicated in broken lines as the hidden structure in the plan view of FIG. 3. The axle 28 is in turn secured to the cart 10 by means of a pair of laterally spaced apart axle supports 30 and 32, each positioned immediately inboard of a respective wheel 24/26.

It will be noted in FIG. 2 that the lower circumferential portion 34 of the wheels 24/26 are substantially coplanar with the shelf underside or base support 20, with the wheels contributing little or nothing to the support of the cart 10 when it is in a substantially vertical rest position. However, as the wheels 24/26 define the lower rear edge or limit of the cart 10, it will be seen that any rearward tilting of the cart 10 will cause the cart 10 to essentially pivot about the rearwardly disposed wheels 24/26, and to lift the base 20 from the underlying surface to cause the wheels 24/26 to provide the entire support of the cart 10 and any contents thereof. Thus, a user of the present cart 10 need not provide any lifting action to move the cart 10 from a rest position to a transport position, but need only lean slightly rearwardly while pulling the upper portion of the cart 10 rearwardly, to place the center of mass of the cart 10 and any contents thereof, substantially over the wheels 24/26. This action will be seen to be much more advantageous particularly to those persons who may have some form of back injury or problem, and who cannot safely lift any substantial weight.

In order to simplify the above described operation, a lateral handle 34 is provided adjacent the open upper edge 36 of the rear wall 38 of the container or basket 12. (The rear wall 38 of the container 12 will be seen to be coplanar and integral with the lower rear panel 16 which connects the upper container 12 and lower shelf 14 together.) The handle 34 is supported by two laterally spaced apart handle supports 40 and 42 which extend rearwardly from the upper rear portion of the container or basket 12. The handle 34 and handle supports 40/42 may be molded or otherwise formed integrally with the balance of the structure of the present cart.

Preferably, the present cart 10 is molded or otherwise formed of plastic (polyethylene, polyurethane, or other plastic as desired) as a single, integral and unitary structure (excepting the wheels and perhaps the axle), to provide economy of construction, light weight, durability, and resistance to corrosion. Such plastic materials may be relatively flexible in sheet form, so accordingly the rear wall 16 is preferably provided with lateral edges 44 and 46 which serve as stiffening and reinforcing flanges for the rear wall 16 to preclude excessive flexing of the rear wall 16, particularly when a load is placed within the upper basket or container 12. These stiffening and reinforcing flange edges 44/46 may have a relatively wide and generally semicircular "C" shape cross section, as shown in FIG. 3, or other suitable section (rectangular, etc.) as desired.

These smoothly and inwardly curved rear wall lateral edges 44 and 46 also provide another function, in that they provide a smoothly rounded external edge which substantially reduces or eliminates any hazard of a cut or other wound from occurring from contact with an otherwise relatively sharp edge. In a similar manner, the upper edge 36 of the upper basket or container 12 is also smoothly rounded. The lower shelf area 14 also includes a peripheral edge having an upstanding article retaining wall 48 extending from the front and two opposite lateral edges thereof. (The rear portion of the shelf periphery is limited by the rear wall 16, which also serves as an article retaining wall for the rear edge of the shelf 14.) The upper edge 50 of the lower shelf article retaining wall 48 is also preferably smoothly rounded, for the same reason as the rounded upper edge 36 of the upper container 12.

The present cart 10 may be utilized in the performance of innumerable chores and tasks. However, it is particularly suited for use in the laundering of clothing and other articles, with the upper container or laundry basket 12 being well suited for the carriage of laundry therein and the lower storage shelf serving for the carriage of laundry products (detergents, bleaches, fabric softeners, measuring cups, etc.) therein. Accordingly, the upper basket 12 may be provided with ventilation slots or passages 52 therein, as desired. In the present embodiment, they are shown in both the rear panel 38 and the opposite front panel 54 of the generally rectangular basket 12. However, it will be seen that they may also be provided in one or both of the two side panels 56 as well or instead of in the front and rear panel 54 and 38. The bottom panel 58 may also be provided with ventilation passages 52 if desired, as shown in cross section in FIG. 2.

In summary, the present cart 10 will be seen to provide an extremely versatile tool, useful in the performance of a variety of chores. The cart 10 is well suited for the carriage of bulky articles around the home, as the generally vertical configuration obviates any need for bending and lifting of large, bulky articles, such as laundry baskets and the like. The cart 10 is well suited for use in doing household laundry, by means of the upper laundry basket 12 and the lower laundry supply storage area 14. The generally vertical configuration permits the cart 10 to be stored in a relatively small area, and in fact the device may be readily used as a laundry hamper when not actually in use to transport clothing or other articles to or from the wash. Storage of laundry articles is equally convenient, with no additional horizontal space being required due to their placement immediately below the basket.

The present cart 10 will be seen to be of value in the performance of other household chores, such as in the carriage of household cleaning supplies, with brooms, mops, etc. perhaps being carried in the open upper container 12 and other supplies being carried on the lower shelf 14. The cart 10 is also of value in yard work, with large or bulky articles (e.g., hoses, yard waste such as bagged clippings, small branches, etc.) being carried in the upper container 12, and other tools (shears, gloves, etc.) being carried on the lower shelf 14. The cart will also be seen to be useful in light automotive maintenance, with the lower shelf being useful as a battery cart and the upper basket providing for the carriage of jumper cables, and/or for car washing, with the upper basket providing for the carriage and/or storage of a car cover and the lower shelf being useful for the carriage of cleaning supplies (wash bucket, sponges, soap, wax, etc.).

The generally flat, level base support 20 of the cart 10, provides a non-slip resting surface for the cart, as the wheels 24/26 provide little or no support when the cart 10 is vertically disposed. Yet, tilting the cart 10 rearward to position the mass of the cart and any articles therein generally over the wheels, allows the cart 10 to be moved freely with the entire mass being supported by the wheels at the lower rear edge of the cart. No substantial lifting of any relatively heavy or bulky articles is required in using the present cart 10, due to its configuration. Thus, the present cart 10 is a welcome tool for anyone who may be limited in their lifting ability, as well as other persons.

It is to be understood that the present invention is not limited to the sole embodiment described above, but encompasses any and all embodiments within the scope of the following claims.

I claim:

1. A utility cart, comprising:
    an open topped upper container and an open lower storage shelf, with said upper container and said lower shelf being disposed in a substantially vertical array;
    a rear panel extending between said upper container and said lower shelf, said rear panel having opposite lateral edges, each of said lateral edges including a wide generally semicircular stiffening flange;
    said lower shelf having a floor disposed in a substantially horizontal plane when said cart is in a substantially vertical rest position, with said floor of said lower shelf serving as a base support for said cart when said cart is in a rest position, and;
    said floor of said lower shelf having a raised rearward portion, with a lateral axle having a pair of wheels thereon disposed beneath said raised rearward portion of said floor and defining a lower rear edge for said cart, and with said wheels each having a lowermost circumferential portion disposed substantially coplanar with said base support of said cart when said cart is in a substantially vertical rest position, whereby;

a user of said cart places articles within said upper container and upon said lower shelf as desired, and transports said cart and any articles therein by tilting said cart rearwardly to raise said lower shelf floor above the underlying surface and to position the center of mass of said cart substantially vertically over said wheels, thereby precluding need for significant support of any of the mass of said cart and any articles therein during transport, and places said cart in a substantially vertical rest position with the center of mass of said cart being disposed over said base support of said cart and with said cart resting thereon.

2. The utility cart of claim 1, wherein:

said upper container includes a rear wall, with said rear wall having an upper edge with spaced apart first and second handle supports extending rearwardly from said rear wall adjacent said upper edge of said rear wall, and;

said handle supports include a lateral handle extending therebetween.

3. The utility cart of claim 1, wherein:

said lower shelf includes a periphery, with said lower shelf periphery including an upstanding article retaining wall extending completely therearound.

4. The utility cart of claim 1, wherein:

said upper container includes an upper edge;

said lower shelf includes a periphery, with said lower shelf periphery including an upstanding article retaining wall extending completely therearound, with said article retaining wall having an upper edge; and at least said upper edge of said upper container, said upper edge of said article retaining wall, and said lateral edges of said rear panel are each smoothly rounded.

5. The utility cart of claim 1, wherein:

said upper container includes at least one wall having plurality of ventilation passages therethrough.

6. The utility cart of claim 1, wherein:

said upper container includes at least a forward and a rearward wall, with each said wall having a plurality of ventilation passages therethrough.

7. The utility-cart of claim 1, wherein:

said upper container includes a bottom panel, with said bottom panel having a plurality of ventilation passages therethrough.

8. The utility cart of claim 1, wherein:

at least said upper container, said lower shelf, and said rear panel are formed of plastic as single, unitary article.

9. The utility cart of claim 8, wherein:

said plastic is selected from the group consisting of polyethylene and polyurethane.

10. A laundry cart adapted for use in the laundering of clothing and other articles, said laundry cart comprising:

a generally rectangular open topped upper laundry basket and an open lower laundry supply shelf, with said upper basket and said lower shelf being disposed in a substantially vertical array;

a rear panel extending between said upper container and said lower shelf, said rear panel having opposite lateral edges, each of said lateral edges including a wide generally semicircular stiffening flange;

said lower shelf having a floor disposed in a substantially horizontal plane when said cart is in a substantially vertical rest position, with said floor of said lower shelf serving as a base support for said cart when said cart is in a rest position, and;

said floor of said lower shelf having a raised rearward portion, with a lateral axle having a pair of wheels thereon disposed beneath said raised rearward portion of said floor and defining a lower rear edge for said cart, and with said wheels each having a lowermost circumferential portion disposed substantially coplanar with said base support of said cart when said cart is in a substantially vertical rest position, whereby;

a user of said laundry cart places laundry articles within said upper basket and laundry supplies upon said lower shelf as desired, and transports said cart and any laundry articles and supplies therein by tilting said cart rearwardly to raise said lower shelf floor above the underlying surface and to position the center of mass of said cart substantially vertically over said wheels, thereby precluding need for significant support of any of the mass of said cart and any articles therein during transport, and places said cart in a substantially vertical rest position with the center of mass of said cart being disposed over said base support of said cart and with said cart resting thereon.

11. The laundry cart of claim 10, wherein:

said upper basket includes a rear wall, with said rear wall having an upper edge with spaced apart first and second handle supports extending rearwardly from said rear wall adjacent said upper edge of said rear wall, and;

said handle supports include a lateral handle extending therebetween.

12. The laundry cart of claim 10, wherein:

said lower shelf includes a periphery, with said lower shelf periphery including an upstanding laundry supply retaining wall extending completely therearound.

13. The laundry cart of claim 10, wherein:

said upper basket includes an upper edge;

said lower shelf includes a periphery, with said lower shelf periphery including an upstanding laundry supply retaining wall extending completely therearound, with said laundry supply retaining wall having an upper edge; and at least said upper edge of said upper basket, said upper edge of said laundry supply retaining wall, and said lateral edges of said rear panel are each smoothly rounded.

14. The laundry cart claim 10, wherein:

said upper basket includes at least one wall having a plurality of ventilation passages therethrough.

15. The laundry cart of claim 10, wherein:

said upper basket includes at least a forward and a rearward wall, with each said wall having a plurality of ventilation passages therethrough.

16. The laundry cart of claim 10, wherein:

said upper basket includes a bottom panel, with said bottom panel having a plurality of ventilation passages therethrough.

17. The laundry cart of claim 10, wherein:

at least said upper basket, said lower shelf, and said rear panel are formed of plastic as single, unitary article.

18. The laundry cart of claim 17, wherein:

said plastic is selected from the group consisting of polyethylene and polyurethane.

\* \* \* \* \*